United States Patent [19]

Straube

[11] Patent Number: 5,037,118
[45] Date of Patent: Aug. 6, 1991

[54] BRUSH AND LOG HAULING CART

[76] Inventor: Jeffrey Straube, Rte. 1, Highland, Ill. 62249

[21] Appl. No.: 565,995

[22] Filed: Aug. 10, 1990

[51] Int. Cl.$^5$ .......................... B62B 1/12; B62B 5/00
[52] U.S. Cl. .............................. 280/79.6; 280/47.18; 280/47.24; 280/147
[58] Field of Search .......... 280/47.131, 47.26, 47.331, 280/79.6, 652, 144, 147, 47.18, 47.19, 47.24, 656, 659

[56] References Cited

U.S. PATENT DOCUMENTS

| | | | |
|---|---|---|---|
| 900,455 | 10/1908 | Weir | 280/653 |
| 972,041 | 10/1910 | Tucker | 280/144 |
| 1,122,805 | 12/1914 | Schertz | 280/47.131 |
| 1,730,777 | 10/1929 | Mayer | 280/144 |
| 2,260,676 | 10/1941 | Lafaye, Sr. | 280/47.331 X |
| 2,569,118 | 9/1951 | Sherman | 280/47.18 |
| 3,021,011 | 2/1962 | Visneski | 280/79.6 X |
| 3,917,083 | 11/1975 | Caron | 280/47.331 X |
| 4,049,283 | 9/1977 | Brookes et al. | 280/47.131 |
| 4,052,080 | 10/1977 | Hedderich et al. | 280/47.26 |
| 4,214,774 | 7/1980 | Kluge | 280/47.331 X |
| 4,215,877 | 8/1980 | Pritchett | 280/652 |
| 4,316,615 | 2/1982 | Willette | 280/47.18 X |
| 4,566,708 | 1/1986 | Specie | 280/47.131 |
| 4,861,057 | 8/1989 | Kunkle | 280/47.131 |

FOREIGN PATENT DOCUMENTS

| | | | |
|---|---|---|---|
| 8401459 | 12/1985 | Netherlands | 280/47.331 |
| 892212 | 3/1962 | United Kingdom | 280/652 |
| 1061667 | 3/1967 | United Kingdom | 280/79.6 |

Primary Examiner—Andres Kashnikow
Assistant Examiner—Brian L. Johnson
Attorney, Agent, or Firm—Robbins & Robbins

[57] ABSTRACT

A cart for hauling brush and logs is provided. The cart consists of a pair of wheels, a crossbar spanning the distance between the wheels, side brackets and a pull handle. The side brackets are slidably adjustable over the ends of the crossbar to accommodate various size loads of brush to be piled on the cart. The ends of the branches are secured by tying to the pull bar. A V-shaped brace member is also provided to slidably fit over the pull handle to serve as a support for logs when the cart is so used.

6 Claims, 2 Drawing Sheets

BRUSH AND LOG HAULING CART

BACKGROUND OF THE INVENTION

The present invention relates to a two-wheeled cart for hauling brush and logs and the like.

Brush clearing is generally a necessary activity preparatory to a further purpose, such a installing a fence, erecting a power line, construction, etc. It has long been a problem to efficiently remove the fallen logs and branches so that the main job may proceed. The brush is usually collected and taken to a place remote from the work area where it may be deposited in a pile for burning or ground up by a portable chipper. In any event, transporting the fallen brush is usually the slowest link in the disposal process.

Present methods of collecting brush are generally inefficient. Carrying or hauling the brush by hand is too cumbersome and requires many trips. The size of the load is limited by the physical capacity of the individual. Hauling can alternately be done by loading the brush on a trailer. The drawback to this method is that no matter how neatly brush is piled on to the trailer, the branches are loose; unloading will be as time consuming as loading because the branches will have to be picked up separately from each other. A further method would be to bind the ends of several branches together and then haul them as a unit. Although this method keeps the branches together, the untied ends splay out from side to side. This may be a problem if one has to haul the brush through a narrow area such as through a gate.

Accordingly, there is a distinct need for providing means for efficiently hauling brush and logs that will not only increase the size of the load transported but also make the load more compact. It is desirable for such means to be operated by one person.

SUMMARY OF THE INVENTION

By means of the instant invention there has been provided a cart for hauling brush and logs which allows the operator to easily transport a sizeable load of branches. The cart is comprised of two wheels, a crossbar spanning the distance between the wheels, side brackets and a long pull bar. Branches are loaded on the cart with the leafy ends placed over the crossbar and the bough ends pointing to the front of the cart, aligned with the pull bar. The branches should be loaded so that their weight is more or less centered on the crossbar. The leafy ends are held between the side brackets which are adjustable over the ends of the crossbar. The bough ends are bound together and secured to the pull bar which provides sufficient leverage to enable the operator to lift the end of the pull bar and transport the load. A V-shaped support attachment slidably connected to the pull bar may be provided as an additional support for the boughs of the branches. Heavy logs may also be transported in this manner by using the V-shaped brace support attachment on the pull bar on which the log rests.

It is therefore an object of this invention to provide a cart for hauling brush and logs that will allow the bough ends of the loaded branches to be bound together as a unit, and at the same time guide the untied ends of the branches together to provide a more compact load.

It is further an object of this invention to provide a simple, two-wheeled cart having a long pull bar to provide leverage in lifting the load, and means to bind the load to the pull bar.

The above features are objects of this invention. Further objects will appear in the detailed description which follows and will be otherwise apparent to those skilled in the art.

For purpose of illustration of this invention a preferred embodiment is shown and described hereinbelow in the accompanying drawing. It is to be understood that this is for the purpose of example only and that the invention is not limited thereto.

IN THE DRAWINGS

DESCRIPTION OF THE INVENTION

Figure 1:
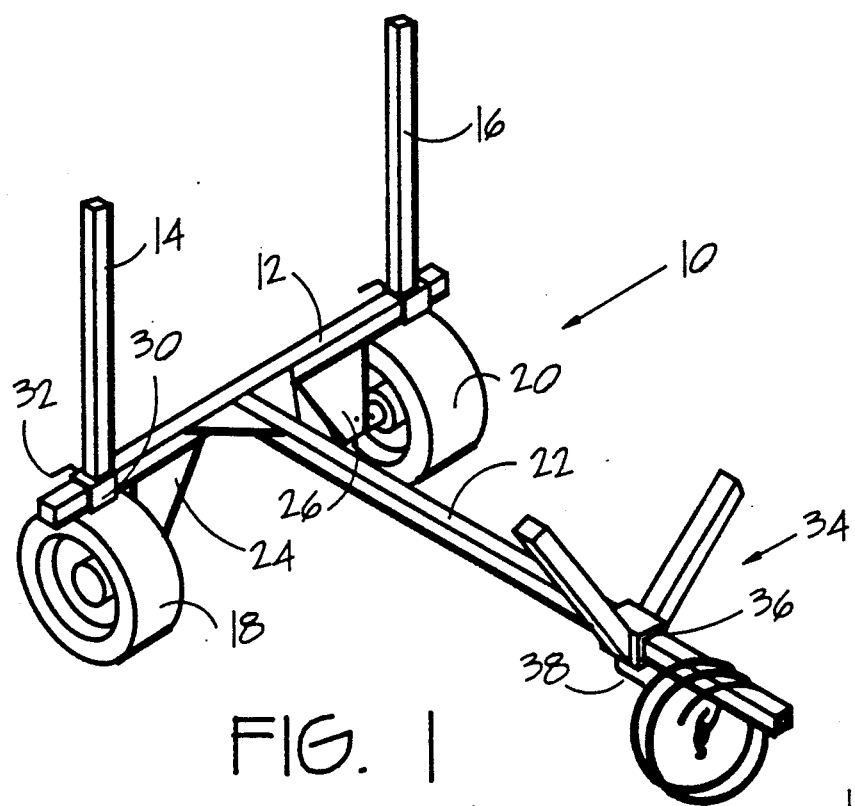
FIG. 1 is a perspective view of the brush hauling cart.

The brush hauling cart of this invention is generally indicated by the reference numeral 10 as shown in FIG. 1. It is comprised of an elongated tubular crossbar 12, a pair of side brackets 14 and 16, a pair of wheels 18 and 20, and a pull handle 22. The crossbar, side brackets and pull handle are best made of tubular steel for strength, but may be composed of any material suitable for the purpose. Wheels 18 and 20 are connected to a bottom surface of crossbar 12 by separate support members 24 and 26, respectively. Alternative arrangements for supporting crossbar 12 may be provided as shown in FIG. 2 by double-legged support member 28.

Figure 2:
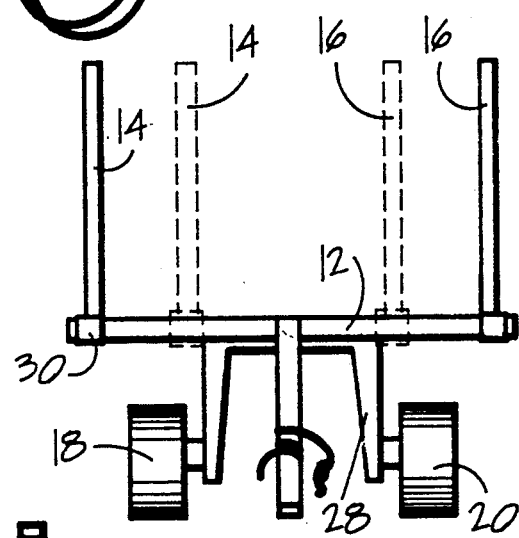
FIG. 2 is a view in side elevation from the front of the brush hauling cart showing the adjustable nature of the side brackets.
Figure 3:
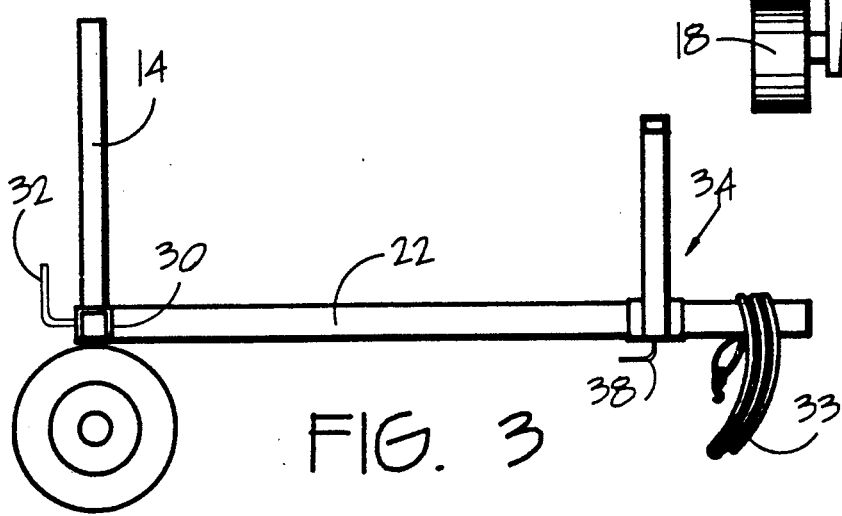
FIG. 3 is a view inside elevation from the side of the cart.

Each of side brackets 14 and 16 extend vertically from crossbar 12 and have a tubular end 30 which provides an integral opening adapted to fit over an end of crossbar 12 in sliding relationship as best shown in FIG. 2. End 30 has clamping means 32 for holding the side brackets into place at a position on crossbar 12. Although the figures show an arm that can be screwed down, it is to be understood that other means exist for holding the side brackets in place for use with the instant invention, such as spaced holes along the crossbar for receiving retaining bolts from the side brackets. Pull handle 22 is connected perpendicularly to the center of crossbar 12. Connection may be effected by welding or other methods known to those skilled in the art. A separate V-shaped support attachment 34 for further support of the branches and support of a log is provided. It has at its vertex an opening 36 adapted to fit over the end of pull handle 22 in sliding relationship. Clamp means 38 are provided for holding support attachment 34 into place along pull handle 22.

USE

Figure 5:
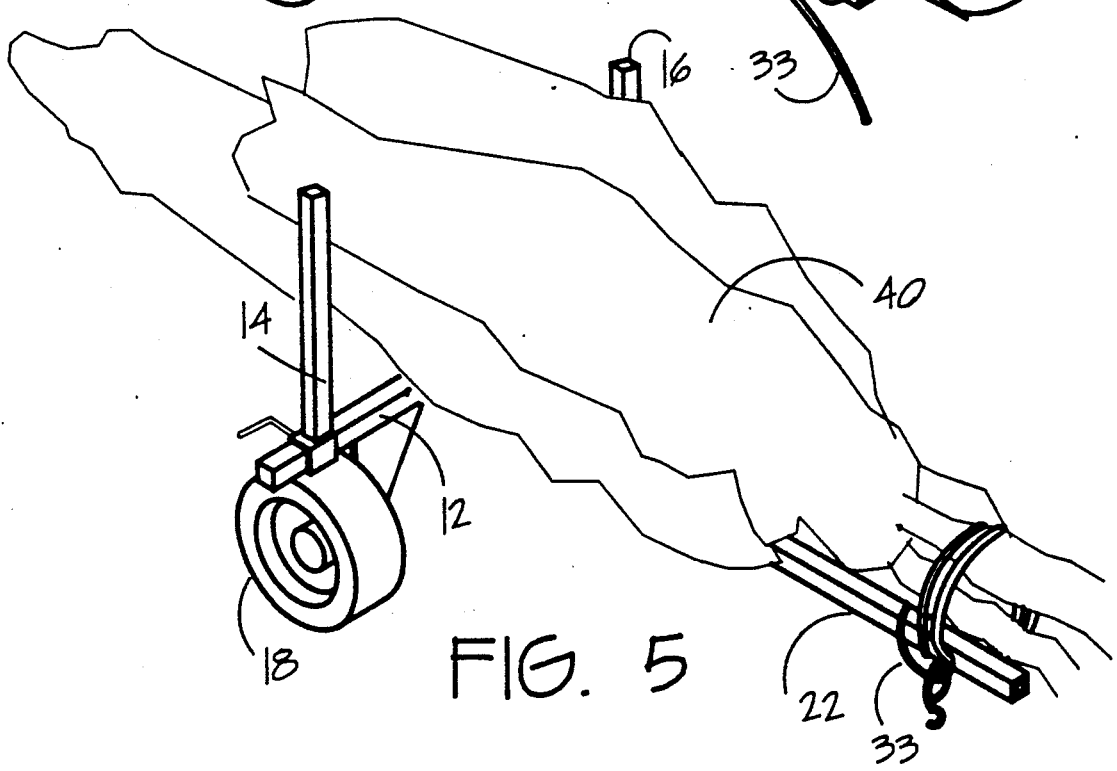
FIG. 5 is a perspective view of the cart with a load of brush.

The brush cart of the instant invention is very simply and efficiently employed in transporting fallen brush and logs. Brush 40 is loaded onto the cart 10 with the leafy ends pointing towards the rear of the cart as shown in FIG. 5. The trunks are aligned with and bound to pull handle 22 using rope and pulley 33. The load is piled on so that most of the weight is towards the rear of the cart and supported on crossbar 12, whereby pull handle 22 may be easily lifted and pulled by a single operator in transporting the brush. Side brackets 14 and 16 are adjusted to positions along crossbar 12 prior to loading to a width sufficient to accommodate the load 40. The side brackets may be moved closer together so that the branches are held together more compactly. This will prevent the branches from splaying out which would make it difficult to haul the load through a narrow area. Extra large loads, where the boughs of the branches extend past pull bar 22, may be transported because all the boughs are bound to the pull bar. In effect this makes any one of the boughs an extension of the pull bar. Thus, the operator may grasp a bough as a means of pulling the cart when transporting brush.

Figure 4:
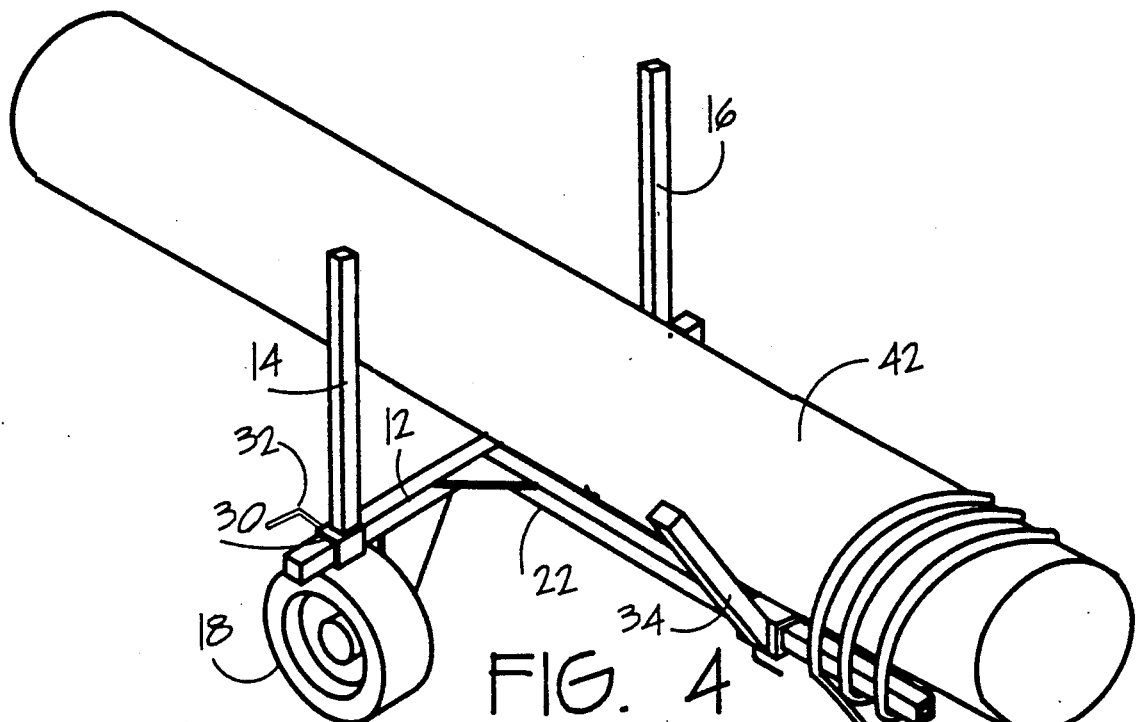
FIG. 4 is a perspective view of the crt loaded with a log.

Large logs may also be transported using the cart of the invention. A log 42 is placed on the cart with the weight of the log centered on cross bar 12 so that the pull bar 22 may be easily lifted as shown in FIG. 4. The log is further supported on V-shaped support attachment 34 and secured to pull bar 22 by ropes and pulley 33. V-shaped support attachment 34 can also be used as additional support for the boughs of the branches that are bound to the pull handle 22.

Various changes and modifications may be made within this invention as will be apparent to those skilled in the art. Such changes and modifications are within the scope and teaching of this invention as defined in the claims appended hereto.

What is claimed is:

1. A cart for hauling brush comprising two wheels, an elongated tubular crossbar having at least one open unobstructed end, a pair of side brackets, and a pull handle, each of said wheels being connected to at least one support member which is secured to a bottom surface of the crossbar and supports said crossbar, each of said side brackets comprised of an upright member having a tubular member integrally providing an opening of sufficient dimension at one end thereof whereby each of said side brackets is slidably connected onto said crossbar to provide means for adjusting said side brackets to different positions along said crossbar to vary a width between said side brackets to accommodate various sized loads, at least one of said side brackets being removable from said open unobstructed end, and said pull handle being connected perpendicularly to a center portion of said crossbar, whereby brush is loaded on said crossbar between said side brackets and secured as a bundle to said handle.

2. The cart of claim 1 in which said support member is comprised of a top member having two depending leg members to which each of said two wheels are connected.

3. The cart of claim 1 in which binding means are provided comprising a rope and pulley to secure brush to said handle, said pulley being affixed to an end of said rope.

4. The cart of claim 1 in which said crossbar extends a substantial distance greater than a distance between said wheels.

5. A cart for hauling a log comprising two wheels, an elongated tubular crossbar, a pair of side brackets, a pull handle and a brace member, each of said wheels being connected to at least one support member which is secured to a bottom surface of the crossbar and supports said crossbar, each of said side brackets comprised of an upright member having a tubular member integrally providing an opening of sufficient dimension at one end thereof whereby each of said side brackets is slidably connected onto and removed from an unobstructed end of said crossbar to provide means for adjusting said side brackets to different positions along said crossbar to vary a width between said side brackets to accommodate various sized loads, and said pull handle being connected perpendicularly to a center portion of said crossbar, said brace member being V-shaped and slidably connected to a forward portion of said handle to receive a log loaded on said crossbar between said side brackets and supported on said V-shaped brace member.

6. The cart of claim 5 in which said support member is comprised of a top member having two depending leg members to which each of said two wheels are connected.

* * * * *